United States Patent [19]
Nielsen

[11] Patent Number: 5,860,712
[45] Date of Patent: Jan. 19, 1999

[54] STORAGE SYSTEM FOR COMPACT DISKS

[76] Inventor: Frank Nielsen, 2, Vinkelvej, DK-4000 Roskilde, Denmark, 4000

[21] Appl. No.: 669,445
[22] PCT Filed: Jan. 10, 1995
[86] PCT No.: PCT/DK95/00014
   § 371 Date: Jul. 3, 1996
   § 102(e) Date: Jul. 3, 1996
[87] PCT Pub. No.: WO95/19035
   PCT Pub. Date: Jul. 13, 1995

[30] Foreign Application Priority Data
Jan. 10, 1994 [DK] Denmark ................................ 0039/94

[51] Int. Cl.$^6$ ................................................... A47B 81/06
[52] U.S. Cl. ............................ 312/9.59; 211/41; 312/9.61
[58] Field of Search .................................. 312/9.28, 9.24, 312/9.45, 9.53, 9.58, 9.59, 9.61, 907; 211/41

[56] References Cited

U.S. PATENT DOCUMENTS 3,452,878  7/1969  Smith .
4,330,161  5/1982  Khawand .
4,648,514  3/1987  Niles ......................................... 211/41
5,370,244  12/1994 Peng ..................................... 211/41.12
5,509,528  4/1996  Weisburn ............................. 206/308.1
5,515,979  5/1996  Salvail .................................. 312/9.48

FOREIGN PATENT DOCUMENTS 672035    10/1989  Switzerland .
WO92/03823 3/1992  WIPO .

*Primary Examiner*—Peter M. Cuomo
*Assistant Examiner*—Gerald A. Anderson
*Attorney, Agent, or Firm*—Jacobson, Price, Holman & Stern, PLLC

[57] ABSTRACT

A storage system for compact disks including a holder and a loose rail which is secured to the edge of a compact disk cassette. The rail is provided on the top side or at the end with a moulding which together with the moulding of the holder form a fixed and pivotal, respectively, connection. One or several engaging devices are provided on the bottom side of the rail, the engaging devices fitting in mating openings in the edge of the compact disk cassette. In this manner the existing openings in the compact disk cassette are utilized and accordingly the compact disk cassette need not be particularly formed.

3 Claims, 10 Drawing Sheets

FIG. 3A
FIG. 3B
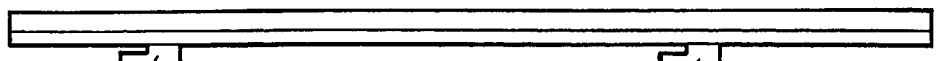
FIG. 3C
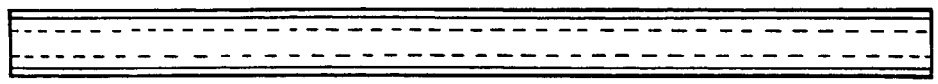
FIG. 3D
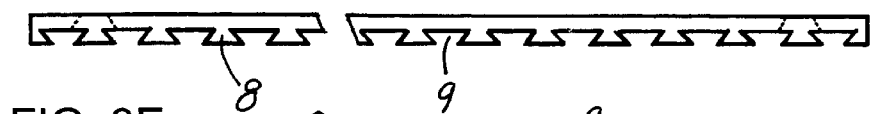
FIG. 3E
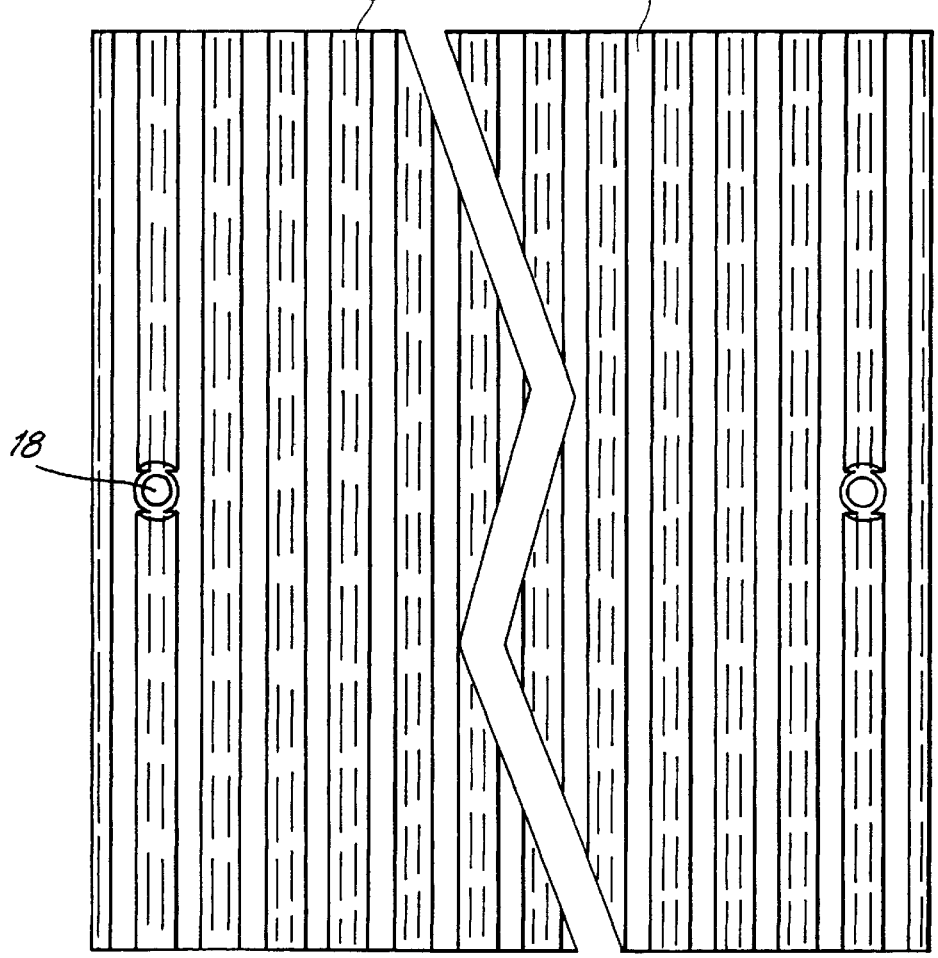

FIG. 4B
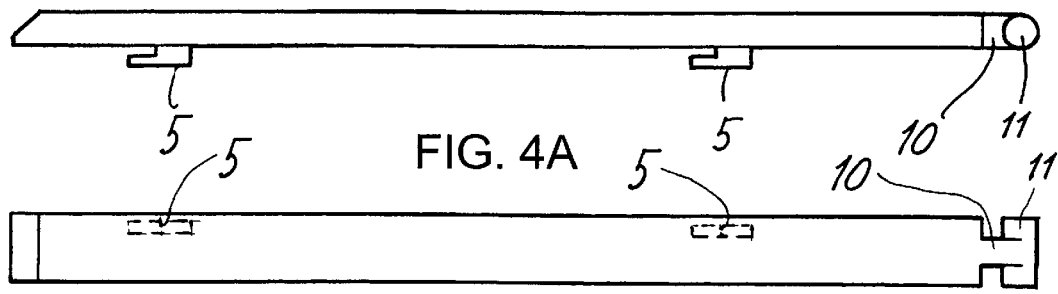
FIG. 4A
FIG. 4C
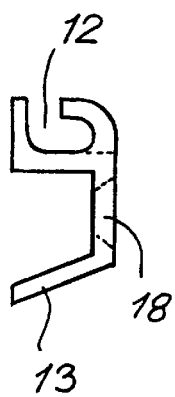
FIG. 4D
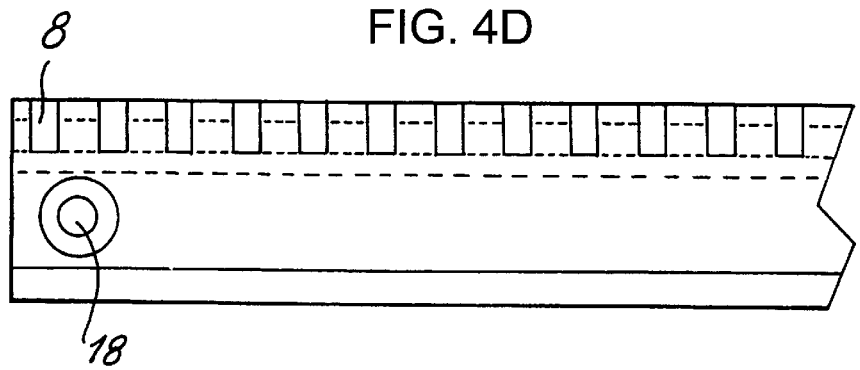
FIG. 4E
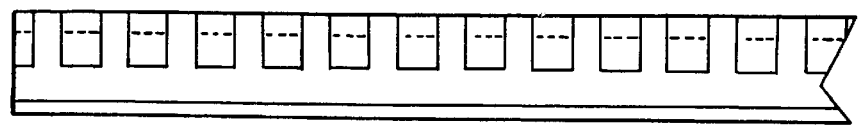

FIG. 5A
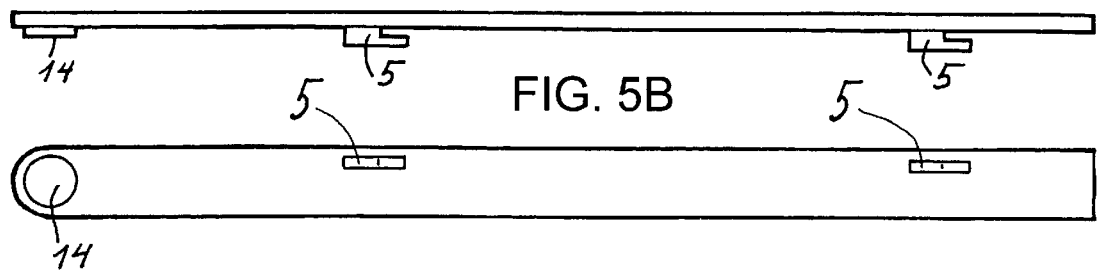
FIG. 5B
FIG. 5C
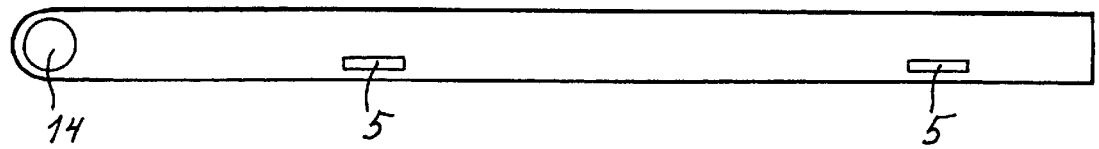
FIG. 5D
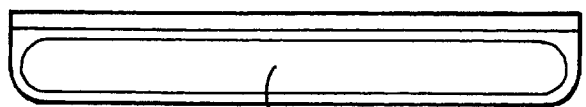
FIG. 5F
FIG. 5E
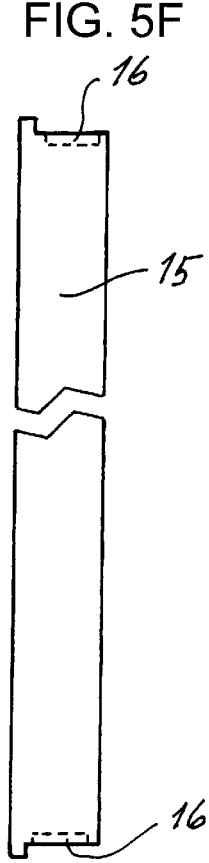
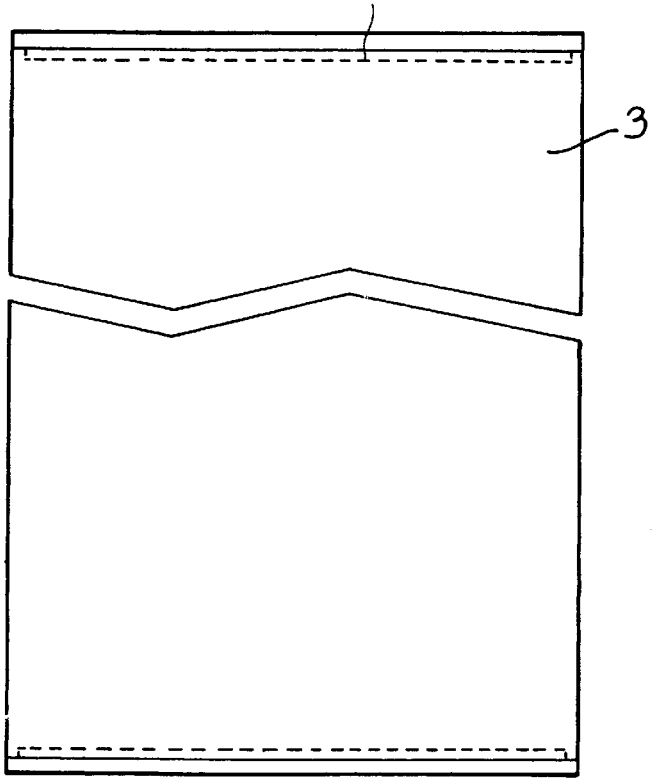

STORAGE SYSTEM FOR COMPACT DISKS

TECHNICAL FIELD

The invention relates to a storage system for compact disks, said storage system comprising a holder and a loose rail which is secured to the edge of the compact disk cassette and which is provided on the top side or at the end with a moulding, said moulding forming a fixed and pivotal, respectively, connection together with the moulding of the holder.

BACKGROUND ART

U.S. Pat. No. 3,452,878 discloses a storage rack for magnetic tape cartridges. The magnetic tape cartridges are provided with projecting adapter pieces, and the top side of each cartridge is provided with a rail which can engage said adapter pieces. At the top, the rail is provided with a moulding fitting in corresponding grooves in a transverse, superadjacent holder to which the rail can be secured.

BRIEF DESCRIPTION OF THE INVENTION

The object of the invention is to provide a storage system for compact disks, which is far more simply structured than the previously known systems.

A storage system of the above type is according to the invention characterised in that the bottom side of the rail is provided with one or several protruding engaging locking means to be inserted in corresponding openings in the edge of the compact disk cassette. In this manner the already existing openings in the compact disk cassette are utilized, and accordingly the compact disk cassette need not be formed in a special way.

According to a particularly advantageous embodiment of the invention, the engaging means are angular, said means being inserted in the openings in the edge of the cassette and then horizontally displaced.

According to an alternative embodiment of the invention, the engaging means are of a split type with barbs being inserted in the openings in the edge of the cassette. The engaging means may alternatively be composed of separate means inserted in the openings in the edge of the cassette through openings in the rails.

According to a second embodiment of the invention, the rail is provided on each side with one or more grooves insertable in corresponding milled grooves in a holder.

As an alternative, it is possible to use two rails being laterally reversed relative to one another, whereby said rails are provided at one end with a flat round pin and can be mounted on both sides of the cover of the compact disk cassette, said round pins being inserted in a holder/folder back provided in the top and the bottom with milled grooves mating the pins of the rail.

BRIEF DESCRIPTION OF THE DRAWINGS

The invention is explained in greater detail below with reference to the accompanying drawings, in which FIGS. 3A–3E illustrate a rail provided on both sides with one or more grooves insertable in corresponding milled grooves in a holder, FIGS. 4A–4D illustrate a rail with two milled grooves in one end and provided with round pins, said milled grooves mating corresponding milled grooves in a wall section, FIG. 4E is a side, front, and top view of the wall section, FIGS. 5A–5F illustrate two rails being laterally reversed relative to one another, which can be mounted at both the upper and the lower edge of the cover of the compact disk cassette, each rail being provided at one end with a flat round pin insertable in a holder.

BEST MODE FOR CARRYING OUT THE INVENTION

Figure 1A:
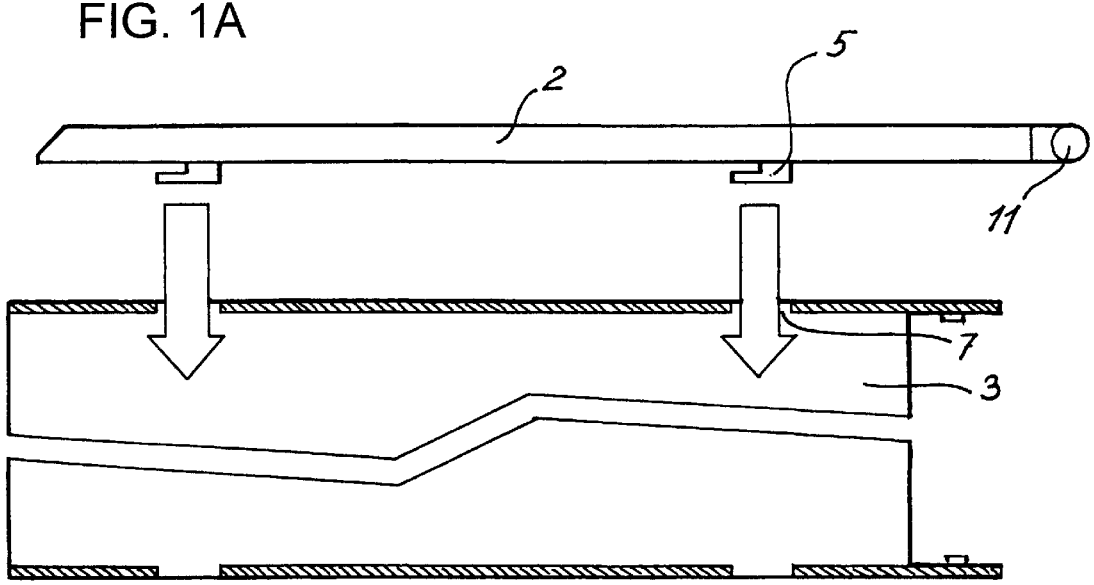
FIGS. 1A, 1B, and 1C illustrate a rail with angular engaging means insertable in the edge of a compact disk cassette.
Figure 1B:
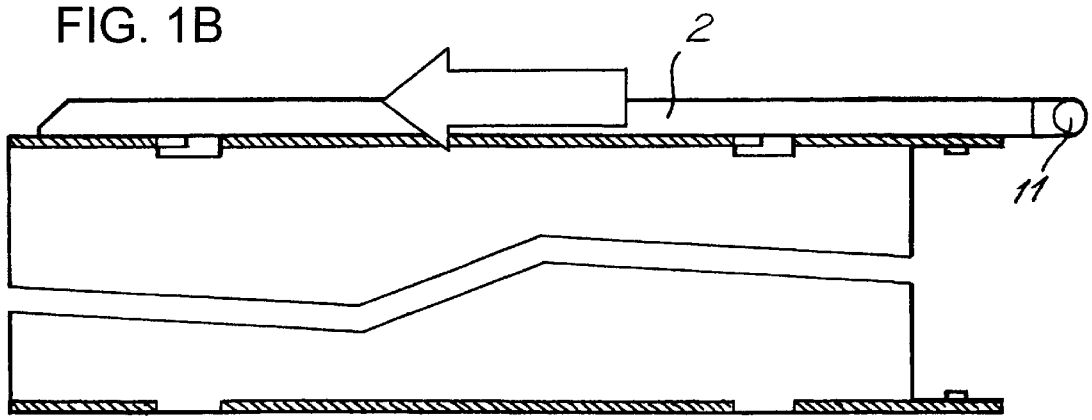
Figure 1C:
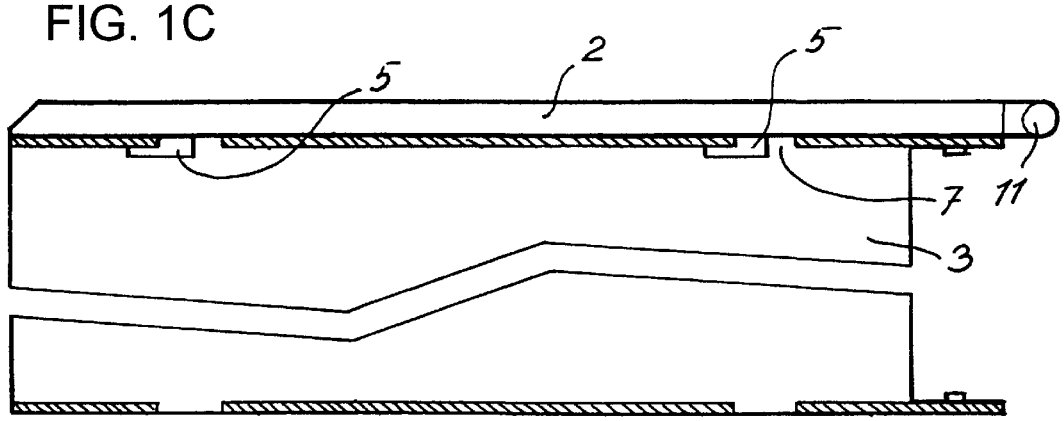

The storage system shown in FIGS. 1A, 1B, and 1C for compact disks 19 comprises a holder 1 and a loose rail 2 which can be secured to the edge of a compact disk cassette 3. On the top side or at the end, the rail 2 is provided with a moulding which forms a fixed and pivotal, respectively, connection together with the moulding of the holder 1. On the bottom side, the rail 2 is provided with one or several angular engaging means 5 fitting in corresponding openings 7 in the edge of the compact disk cassette 3. These openings 7 result from the casting of the cassette whereby inward webs are formed which serve to retain illustrating material for the compact disk. The rail 2 with the 90° angular engaging means 5 are inserted vertically in the openings in the edge of the compact disk cassette 3 and subsequently horizontally displaced in the openings 7 with the result that the rail 2 is clamped into position.

Each rail 2 is of a width of approximately 10 mm and a height of approximately 5 mm, and it is made of aluminium or plastics.

Figure 2A:
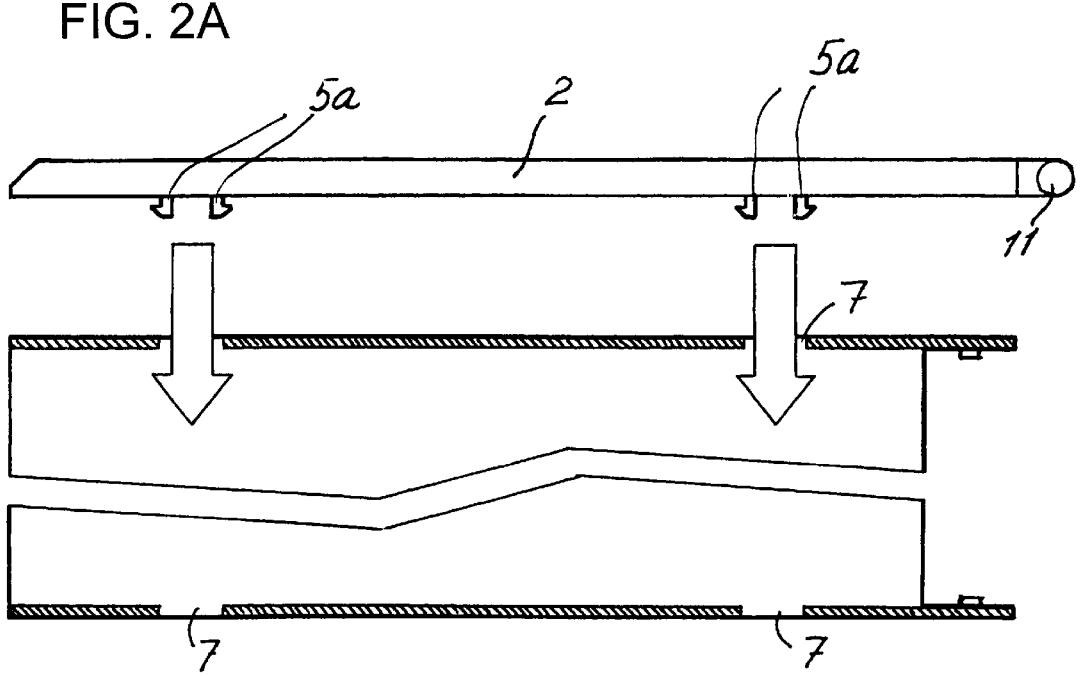
FIGS. 2A and 2B illustrate an alternative embodiment of the engaging means of the rail during the insertion into the edge of a compact disk cassette.
Figure 2B:
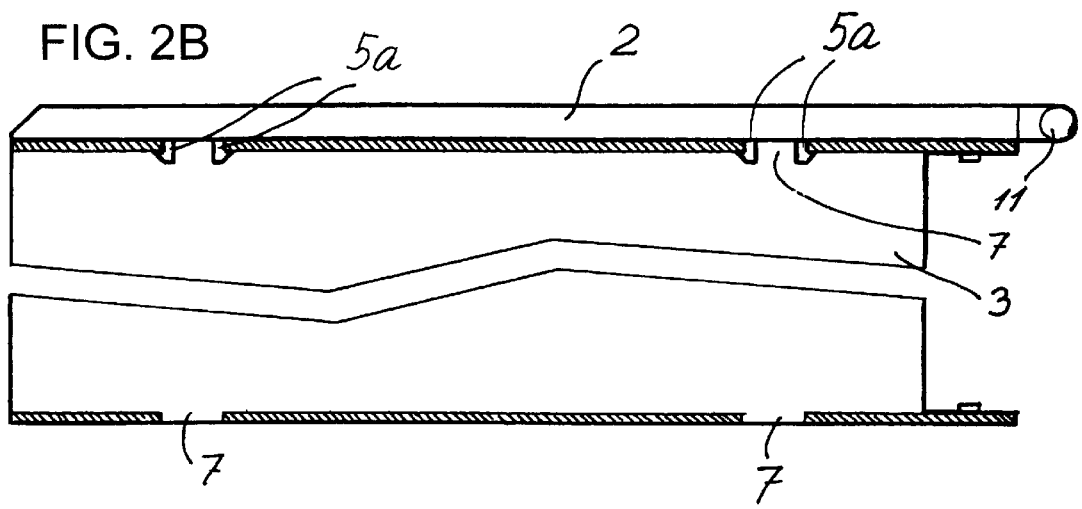

As an alternative, the engaging means 5 can be of the split type with barbs 5a, cf. FIGS. 2A and 2B. Then the rail 2 with the split engaging means 5a is vertically inserted in the openings 7 in the edge of the compact disk cassette 3 and pressed into position. In this manner the compact disk cassette 3 is retained by means of the engaging means 5a.

The engaging means may alternatively be composed of separate or loose means which can be secured to a cassette through openings in the rail.

Figure 3F:
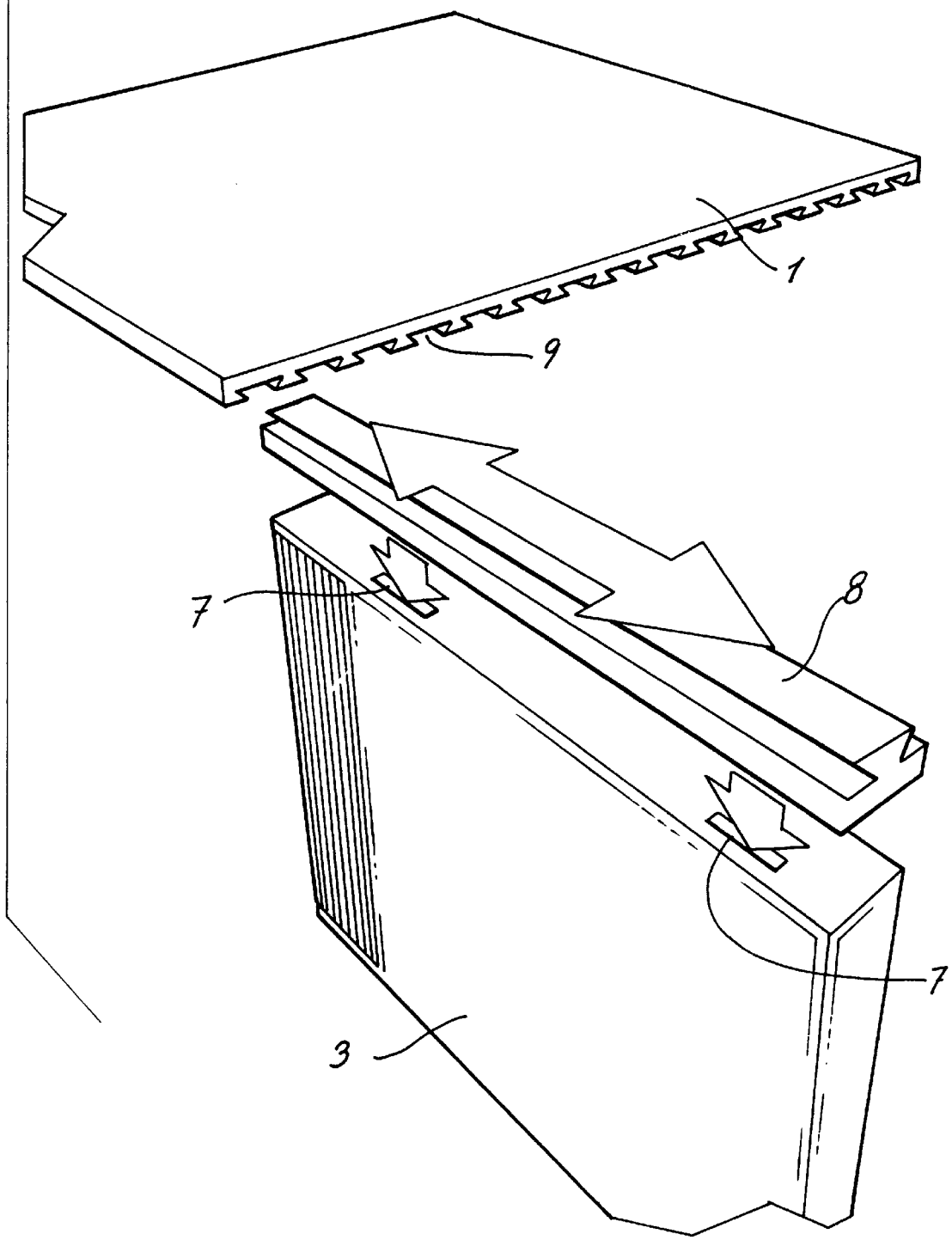
FIG. 3F illustrates how the rails are mounted in the holder.

FIGS. 3A and 3B illustrate a rail 2, which is provided on each side with one or more grooves 8 insertable in mating milled grooves 9 in a holder 1. The holder 1 is for instance mounted below a shelf by means of double-faced tape or screws 18. The compact disk cassette 3 is mounted and retained on the rail 2 which can be inserted in and removed from, respectively, the milled grooves 9 of the holder 1. The compact disk cassette 3 can be opened without necessitating a demounting of the rail 2.

Figure 4F:
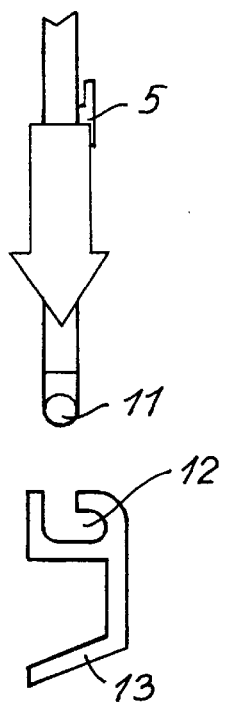
FIGS. 4F–4I illustrate how the rails are mounted in the wall section.
Figure 4G:
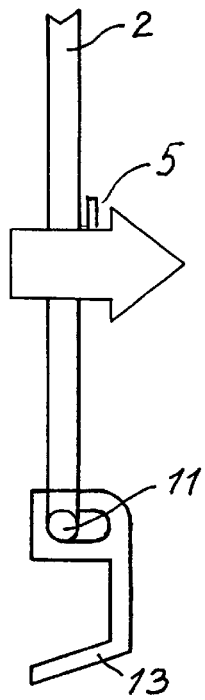
Figure 4H:
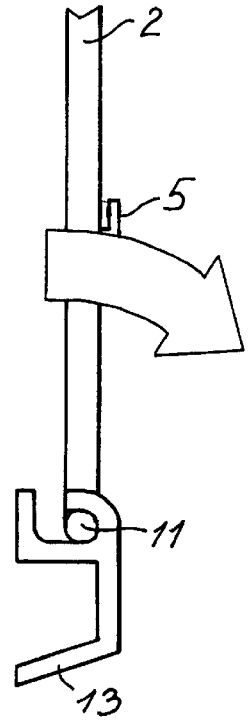
Figure 4I:
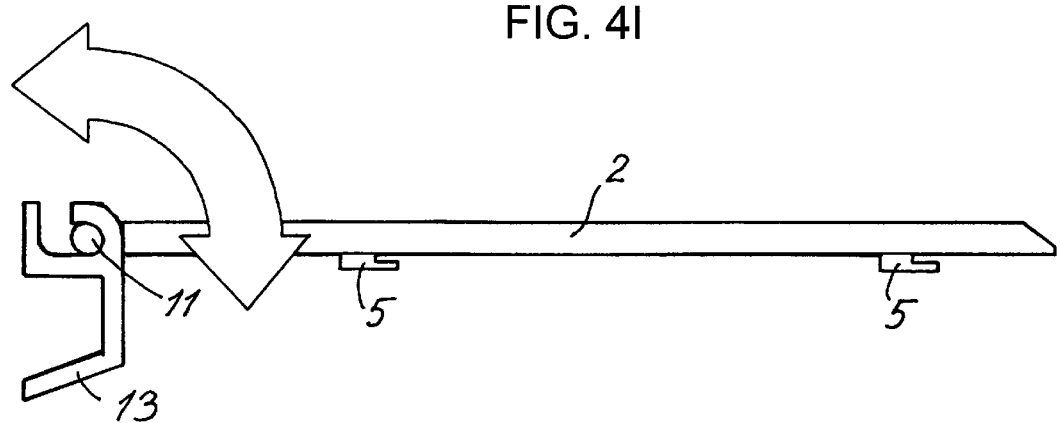
Figure 4J:
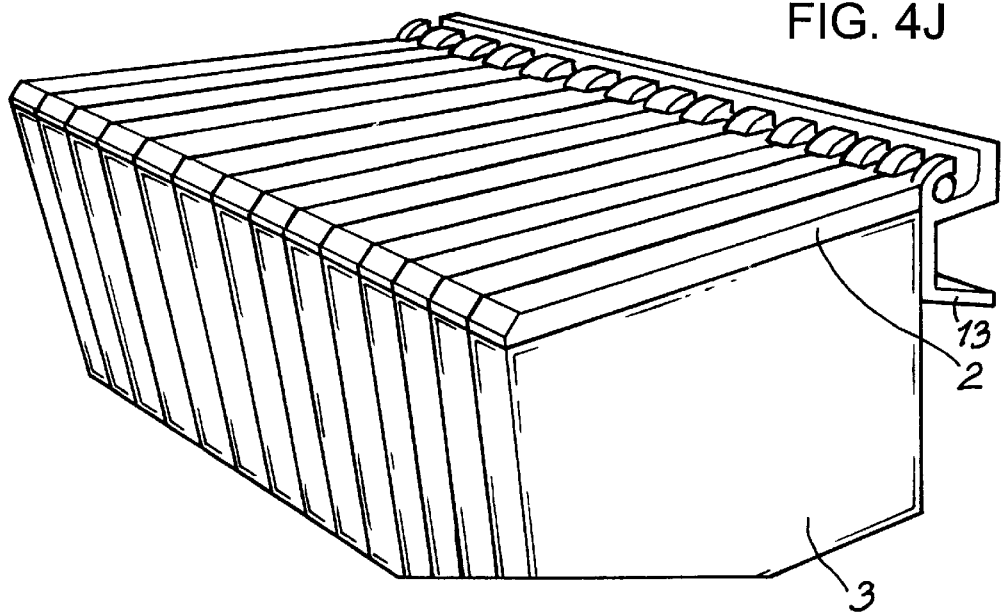
FIGS. 4J and 4K are a perspective view of the mounted cassettes.
Figure 4K:
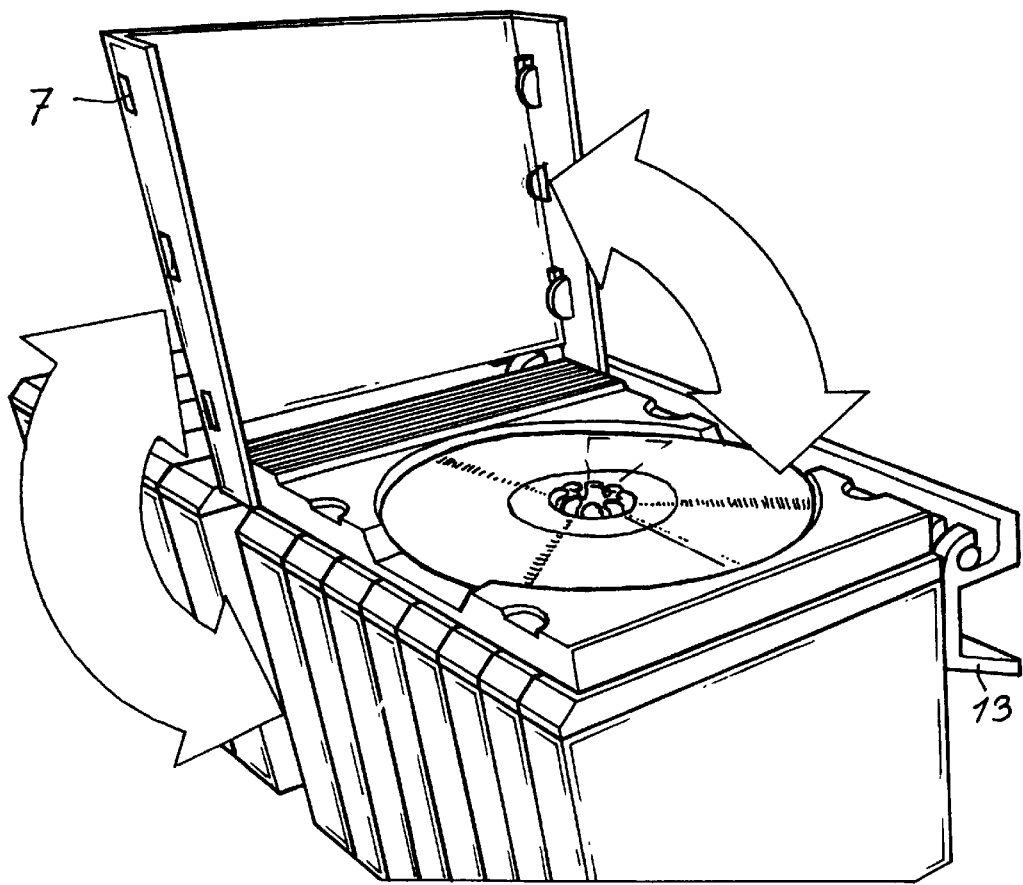

FIGS. 4A and 4B illustrate a rail 2, which is provided at one end with two milled grooves 10 and two round pins 11. The milled grooves 10 and the round pins 11 fit in corresponding milled grooves 12 in a wall section 13.

The wall section comprises a hollow lower part, at which the section is secured to a wall surface by means of screws 18. The wall section comprises further an upper part provided with the milled grooves 12. FIG. 4B illustrates how the round pins 11 are inserted in the milled grooves 12 and then horizontally displaced so as finally to be turned in a downward direction. As a result, the rail 2 cannot be removed directly. The wall section 13 retains a plurality of rails 2 with compact disk cassettes 3 mounted thereon in the stored position. The desired compact disk cassette 3 is tipped upwards whereby the rail 2 is in its vertical position. In this position, the compact disk cassette 3 can be opened and the compact disk 19 can be removed. The compact disk cassette 3 remains in the vertical position until it is closed and tipped into its storing position.

Figure 5G:
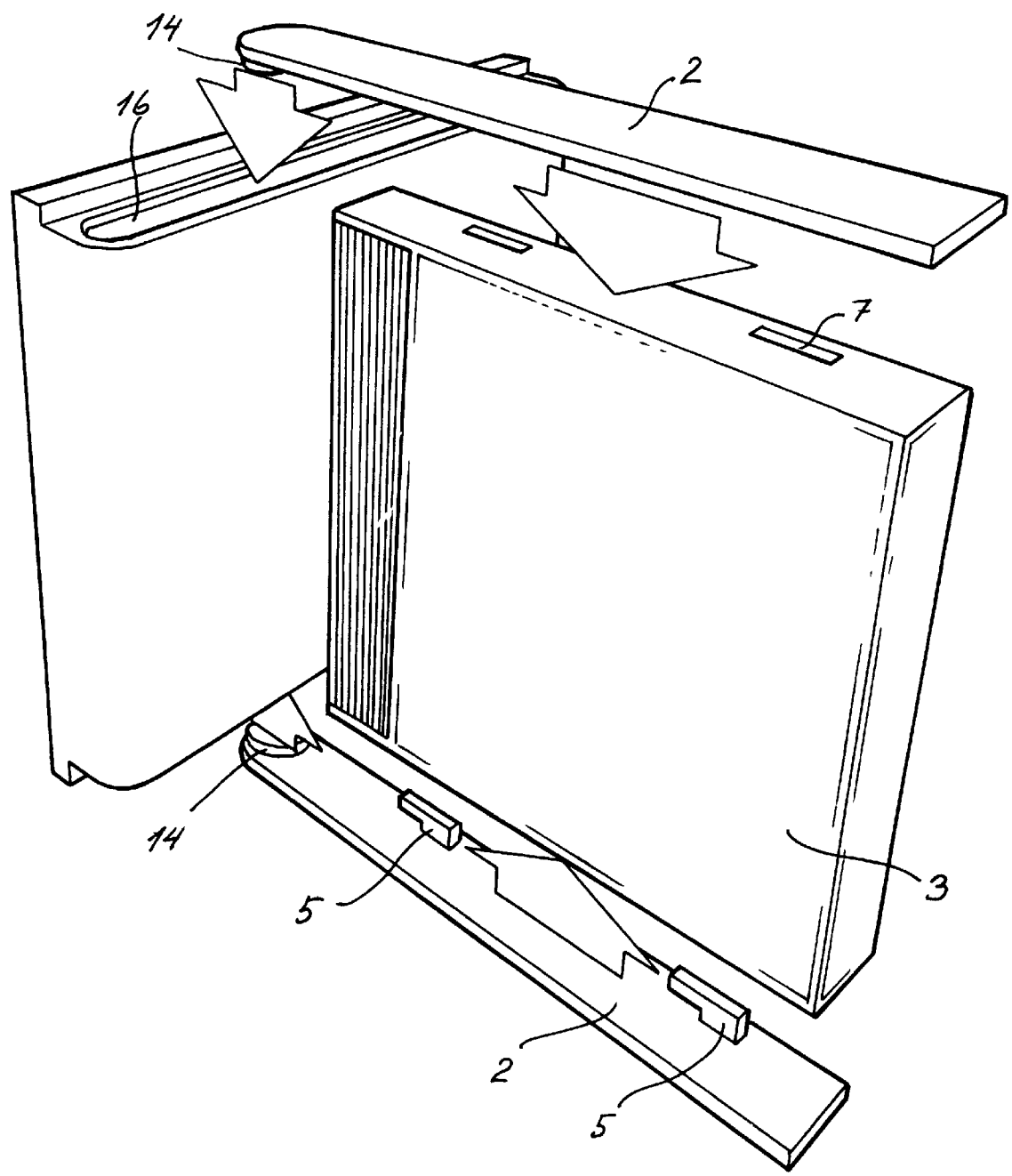
FIG. 5G illustrates how the rails are mounted on each cassette and subsequently inserted in the holder.
Figure 5H:
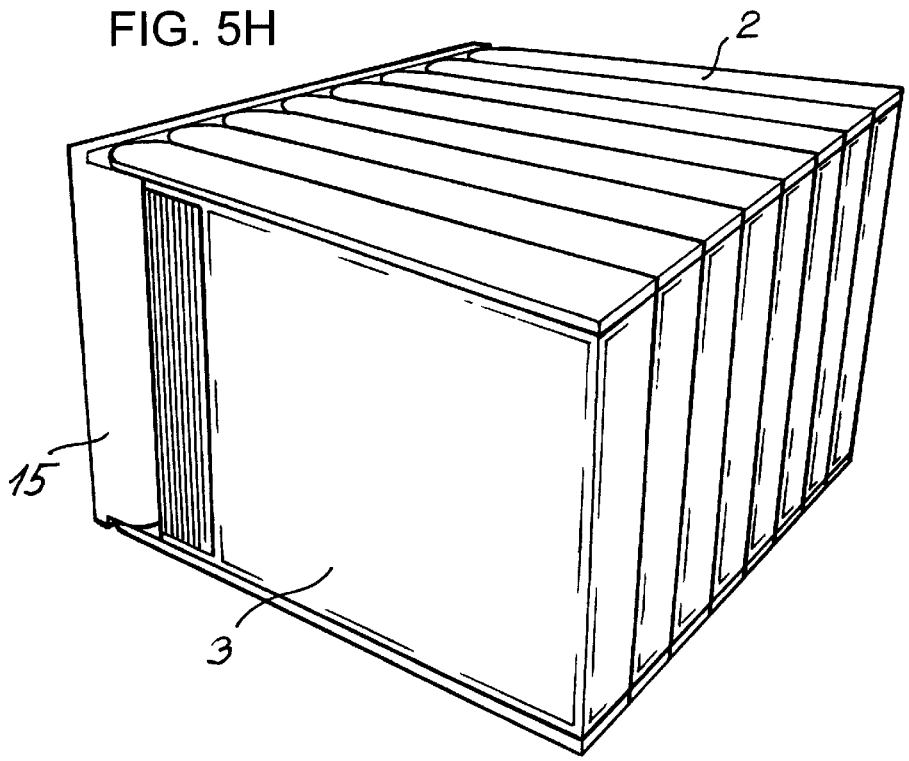
FIGS. 5H and 5I illustrate the mounted cassettes.
Figure 5I:
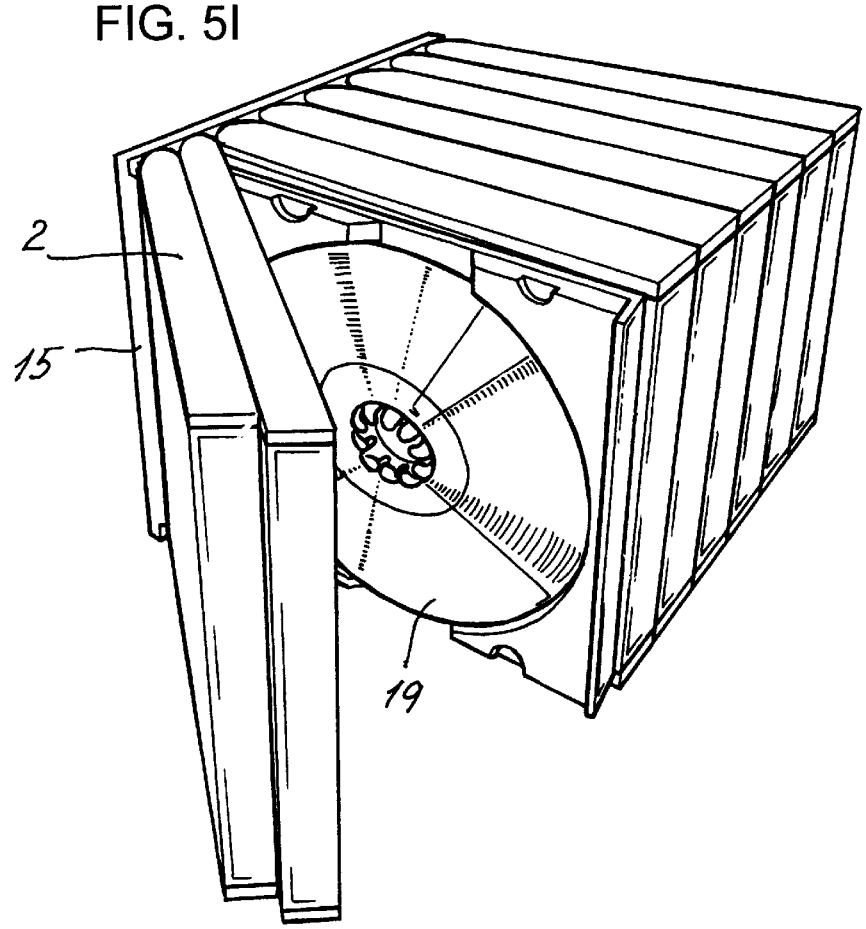

FIGS. 5A, 5B, and 5C illustrate an alternative embodiment where two rails 2 are used, said rails being symmetrical relative to one another. The rails are mounted on both the top and the bottom edge of the cover of the compact disk cassette 3. At the end, the rails 2 are provided with a flat round pin 14. The pins 14 are inserted in a holder in form of a folder back 15, which is provided with a milled groove 16 in the top and the bottom, said milled groove receiving the pins 14. The folder back 15 retains for instance eight compact disk cassettes 3. The desired compact disk cassette 3 can be opened and the compact disk 19 in question can be removed from said cassette 3.

I claim:

1. A compact disk cassette storage system comprising
   a holder,
   a rail secured to an edge of a compact disk cassette having openings, said rail being provided with a moulding which together with the holder form a pivotal connection between said rail and said holder,
   said moulding of said rail including two oppositely directed pins connected by a stem, said stem fitting into a gap between spaced arms of said holder, said arms of said holder engaging said pins to provide for said pivotal connection,
   a bottom side of the rail being provided with at least one integral protruding engaging locking means for inserting in said openings in the edge of the compact disk cassette.

2. A storage system as claimed in claim 1, wherein the engaging locking means are angular and inserted in the openings on the edge of the compact disk cassette and then horizontally displaced.

3. A storage system as claimed in claim 1, wherein the engaging locking means includes barbs inserted in the openings in the edge of the compact disk cassette.

* * * * *